United States Patent
Ezra

(10) Patent No.: US 8,556,145 B1
(45) Date of Patent: Oct. 15, 2013

(54) FOLDABLE CARRIER TRAY FOR USE WITH A VEHICLE

(76) Inventor: Leslie P. Ezra, Winamac, IN (US)

(*) Notice: Subject to any disclaimer, the term of this patent is extended or adjusted under 35 U.S.C. 154(b) by 173 days.

(21) Appl. No.: 13/135,571

(22) Filed: Jul. 8, 2011

(51) Int. Cl.
*B60R 9/06* (2006.01)

(52) U.S. Cl.
USPC .......................................... 224/498; 224/519

(58) Field of Classification Search
USPC ................ 224/495, 497–499, 502, 504–509, 224/519–521; D12/162
See application file for complete search history.

(56) References Cited

U.S. PATENT DOCUMENTS

| | | | | |
|---|---|---|---|---|
| 1,179,823 A * | 4/1916 | Greene | ....................... | 224/42.13 |
| 1,625,808 A * | 4/1927 | Hyde | ............................ | 224/498 |
| 1,635,797 A * | 7/1927 | Mirande | ....................... | 70/201 |
| 1,743,220 A * | 1/1930 | Johnson | ....................... | 224/499 |
| 2,204,824 A * | 6/1940 | Rock | .............................. | 224/500 |
| 2,228,203 A * | 1/1941 | De Hoffmann | ..................... | 5/119 |
| 2,387,779 A * | 10/1945 | Strauss | ......................... | 224/314 |
| 3,163,339 A * | 12/1964 | Merchant | ....................... | 224/503 |
| 3,913,811 A | 10/1975 | Spencer | | |
| 6,131,980 A * | 10/2000 | Sankrithi | .................... | 296/26.11 |
| 6,152,341 A * | 11/2000 | LeMay et al. | ................. | 224/509 |
| 6,382,486 B1 * | 5/2002 | Kretchman et al. | .......... | 224/498 |
| 6,712,248 B2 | 3/2004 | Mitchell | | |
| 2005/0092799 A1 | 5/2005 | Morris | | |
| 2005/0133556 A1 | 6/2005 | Bolin | | |
| 2009/0056592 A1 * | 3/2009 | Threet et al. | ................... | 108/11 |

* cited by examiner

*Primary Examiner* — Nathan J Newhouse
*Assistant Examiner* — Scott McNurlen
(74) *Attorney, Agent, or Firm* — Matthew R. P. Perrone, Jr.

(57) ABSTRACT

A foldable cargo platform is easily mounted on the trailer hitch of a vehicle, and easily folded to a closed position or unfolded to an open position in place on the vehicle or off of the vehicle, due to nestable sections or foldable sections providing a compact platform when the platform is in folded position.

9 Claims, 16 Drawing Sheets

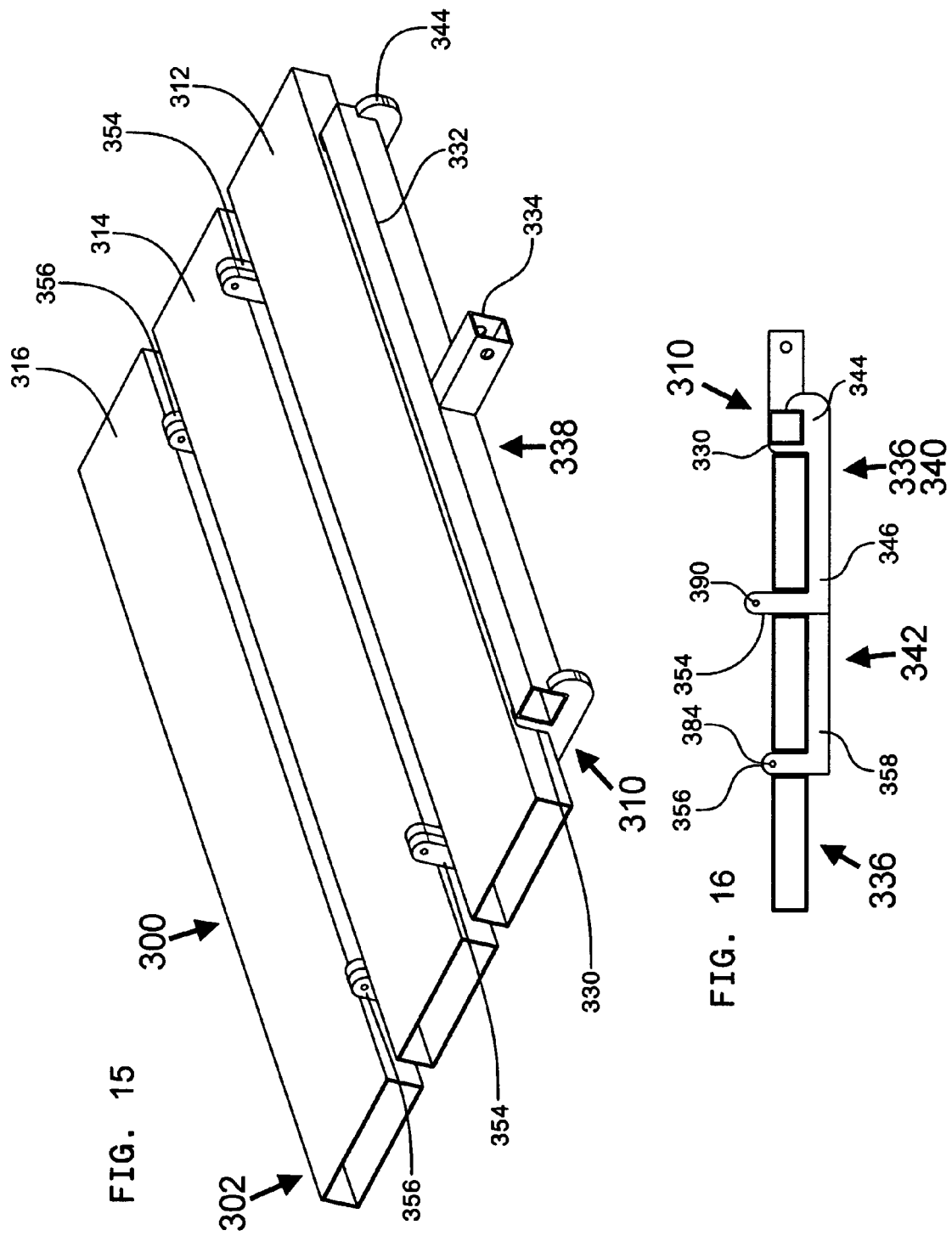

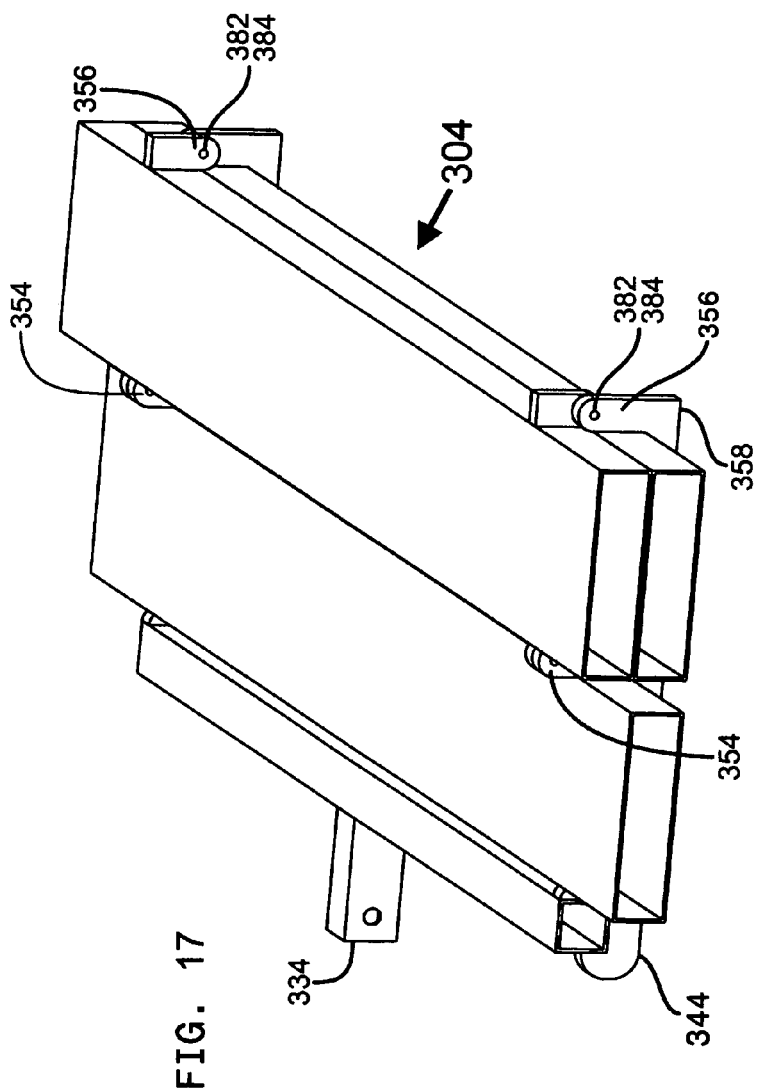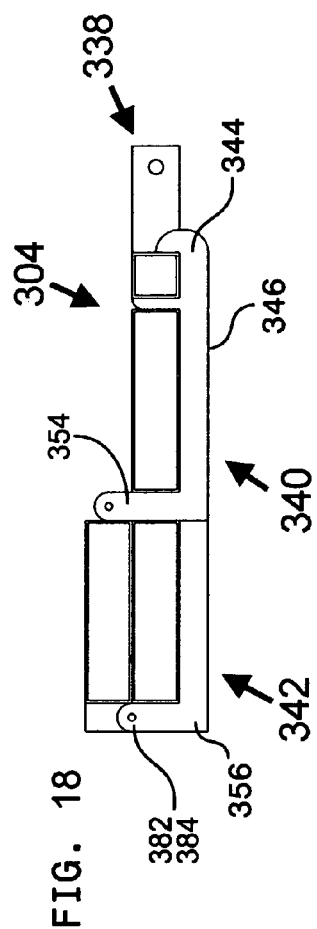

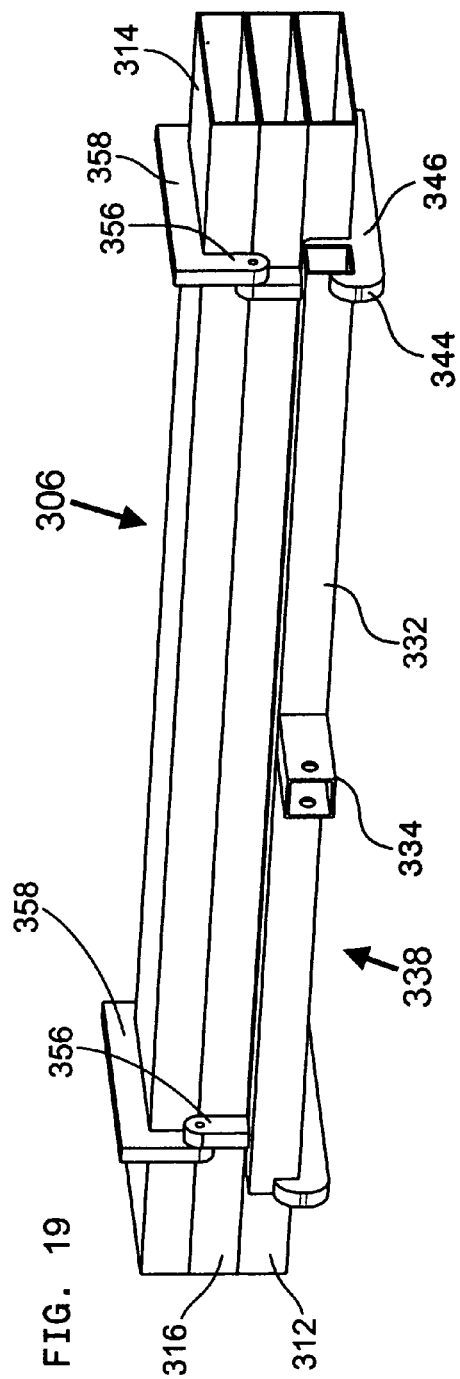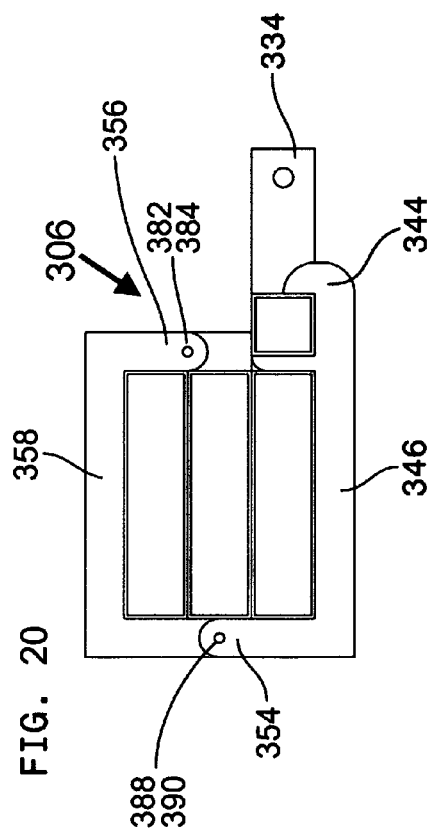

FOLDABLE CARRIER TRAY FOR USE WITH A VEHICLE

This invention relates to a foldable carrier tray for use with a vehicle and more particularly to a foldable carrier tray for use with a vehicle, which may be mounted at the trailer hitch of a vehicle, and folded up as desired for storage or folded down as desired for use.

BACKGROUND OF THE INVENTION

When a vehicle transports cargo or material, advantages can be obtained if loading of the material to be transported can be facilitated, without interfering with the other functions of the vehicle. Typically, it is common to use a mounting for a trailer hitch to secure a cargo platform to a vehicle.

As a result, many such cargo platforms are known for allegedly facilitating such procedures. These devices tend to be bulky and clumsy. To overcome that factor, collapsible devices are now known. But these devices lack the strength or durability, and ease of use, that is most desirable.

Furthermore, such devices which help the vehicle carry cargo, tend to interfere with the use and the enjoyment of the vehicle. For example, storage of the device may be a problem. Also, the cargo platform may interfere with the operation of the trunk or the rear tailgate of the vehicle.

So it is very desirable to find or develop a device which aids a vehicle with the transporting of cargo without drastically interfering with the enjoyment of the vehicle by the owner. If such a device can be developed, great advantages can be obtained.

SUMMARY OF THE INVENTION

Among the many objectives of this invention is the provision of a foldable cargo platform, which may be attached to or removed from a vehicle as desired.

A further objective of this invention is the provision of a foldable cargo platform, which is easily folded.

Yet a further objective of this invention is the provision of a foldable cargo platform, which minimizes interference with vehicle use.

A still further objective of this invention is the provision of a foldable cargo platform, which is easily transported.

Another objective of this invention is the provision of a foldable cargo platform, which is easily adjustable.

Yet another objective of this invention is the provision of a foldable cargo platform, which minimizes interference with the use of a vehicle to which it is attached.

Still another objective of this invention is the provision of a foldable cargo platform, which permits a person to enter a vehicle more easily.

Also, an objective of this invention is the provision of a foldable cargo platform, which permits a person to leave a vehicle more easily.

These and other objectives of the invention (which other objectives become clear by consideration of the specification, claims and drawings as a whole) are met by providing a foldable cargo platform, which is easily mounted on the trailer hitch of a vehicle, and easily folded to a closed position or unfolded to an open position in place on the vehicle or off of the vehicle, due to nestable sections or foldable sections providing a compact platform when the platform is in folded position.

BRIEF DESCRIPTION OF THE DRAWINGS

FIG. 15 depicts a perspective view of the platform cargo assembly 300 of this invention in platform open position 302 as a form of a foldable carrier tray 400.

FIG. 16 depicts a side view of the platform cargo assembly 300 of this invention in platform open position 302, based on FIG. 15.

FIG. 17 depicts a rear, perspective view of the platform cargo assembly 300 of this invention in platform partially folded position 304.

FIG. 18 depicts a side view of the platform cargo assembly 300 of this invention in platform partially folded position 304, based on FIG. 17.

FIG. 19 depicts a front perspective view of the platform cargo assembly 300 of this invention in platform fully folded position 306.

FIG. 20 depicts a side view of the platform cargo assembly 300 of this invention in platform fully folded position 306, based on FIG. 19.

Throughout the figures of the drawings, where the same part appears in more than one figure of the drawings, the same number is applied thereto.

DESCRIPTION OF THE PREFERRED EMBODIMENTS

Figure 1:
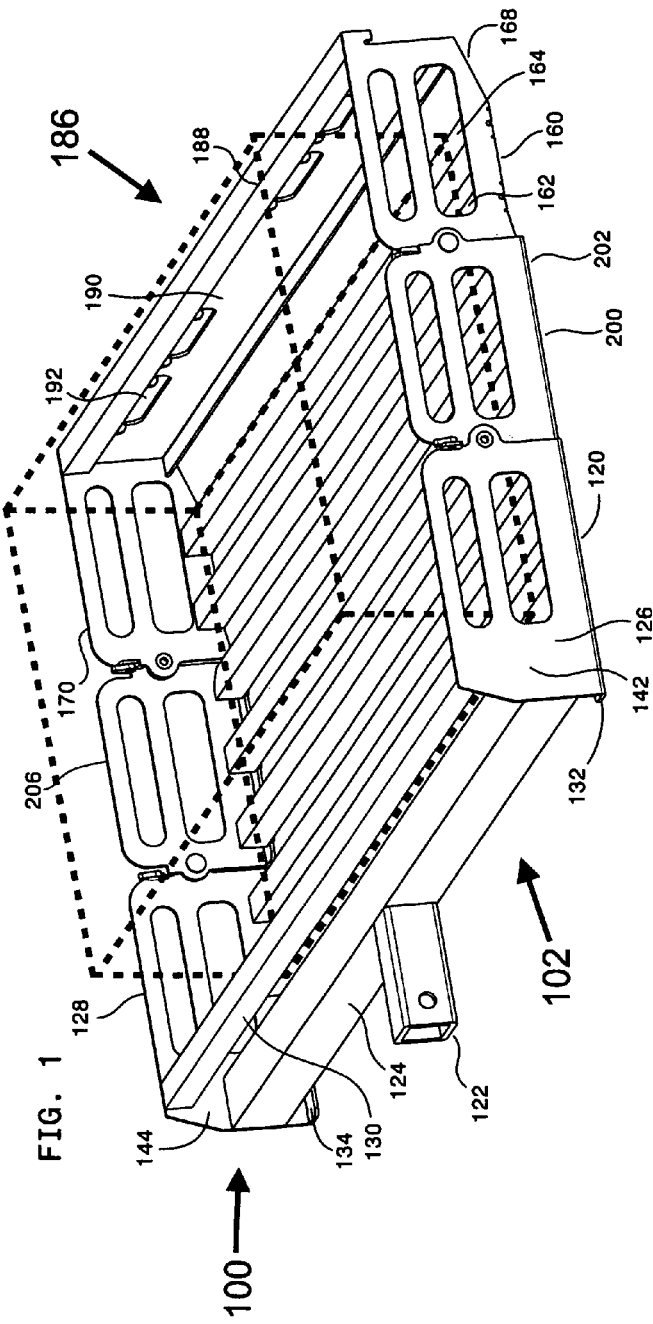
FIG. 1 depicts a side perspective view of the barred cargo assembly 100 of this invention in barred open position 102 as a form of a foldable carrier tray 400 with cargo depicted in phantom.
Figure 2:
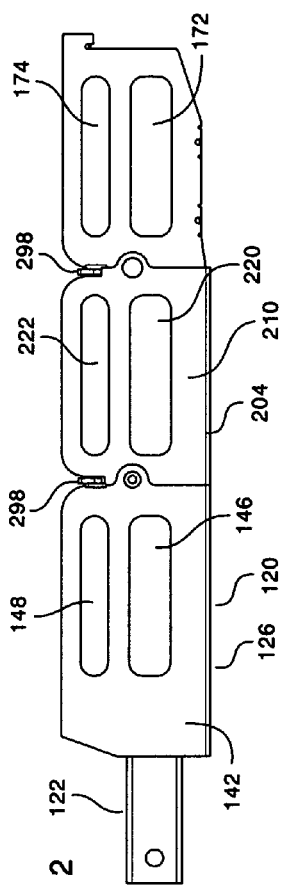
FIG. 2 depicts a side view of the barred cargo assembly 100 of this invention in barred open position 102, based on FIG. 1.
Figure 3:
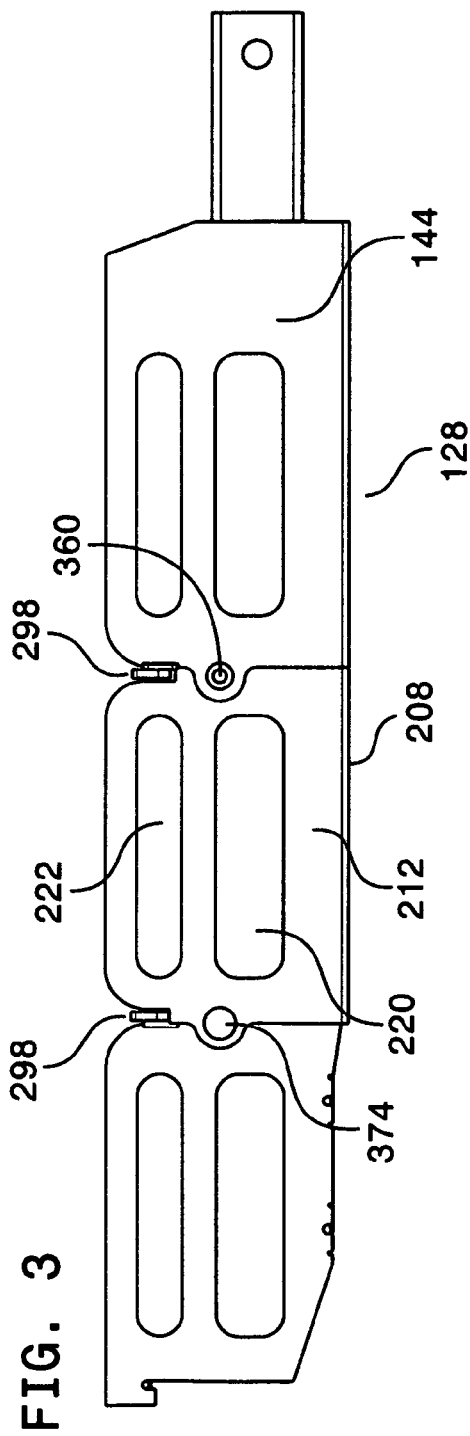
FIG. 3 depicts a side view of the barred cargo assembly 100 of this invention in barred open position 102, and a reverse view of FIG. 2.
Figure 4:
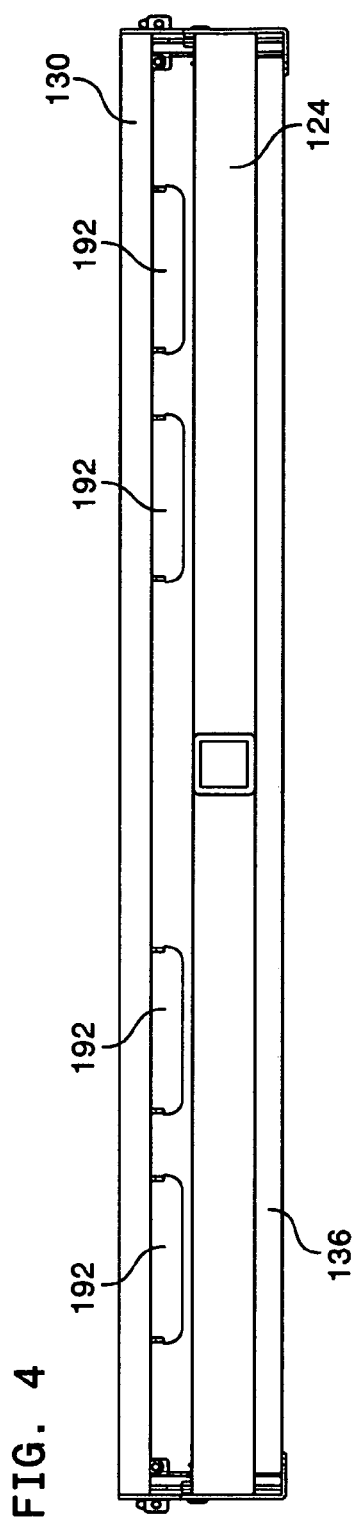
FIG. 4 depicts a front plan view of the barred cargo assembly 100 of this invention.
Figure 5:
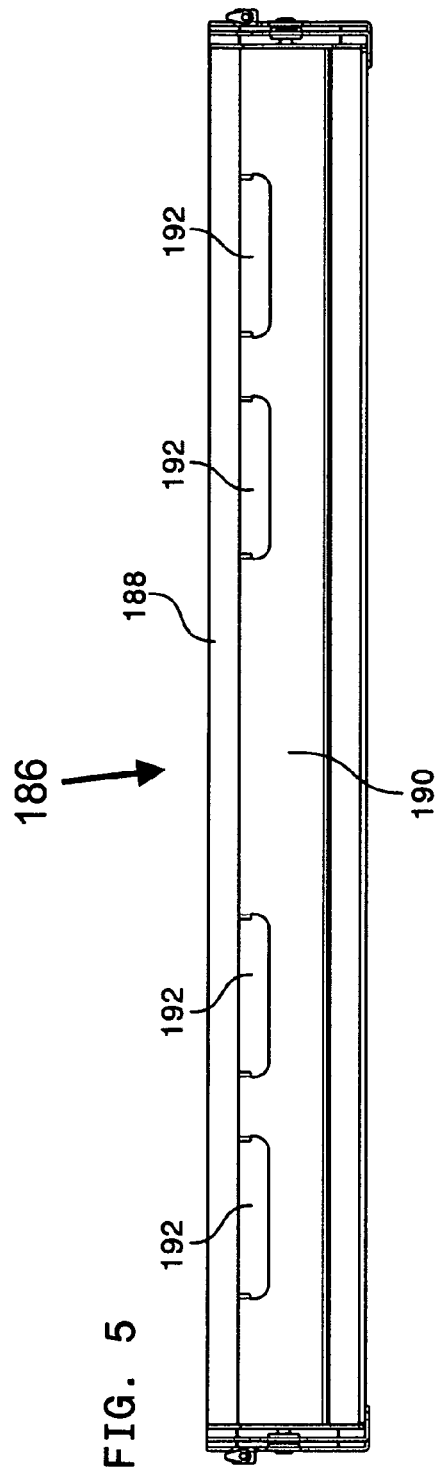
FIG. 5 depicts a rear plan view of the barred cargo assembly 100 of this invention.
Figure 6:
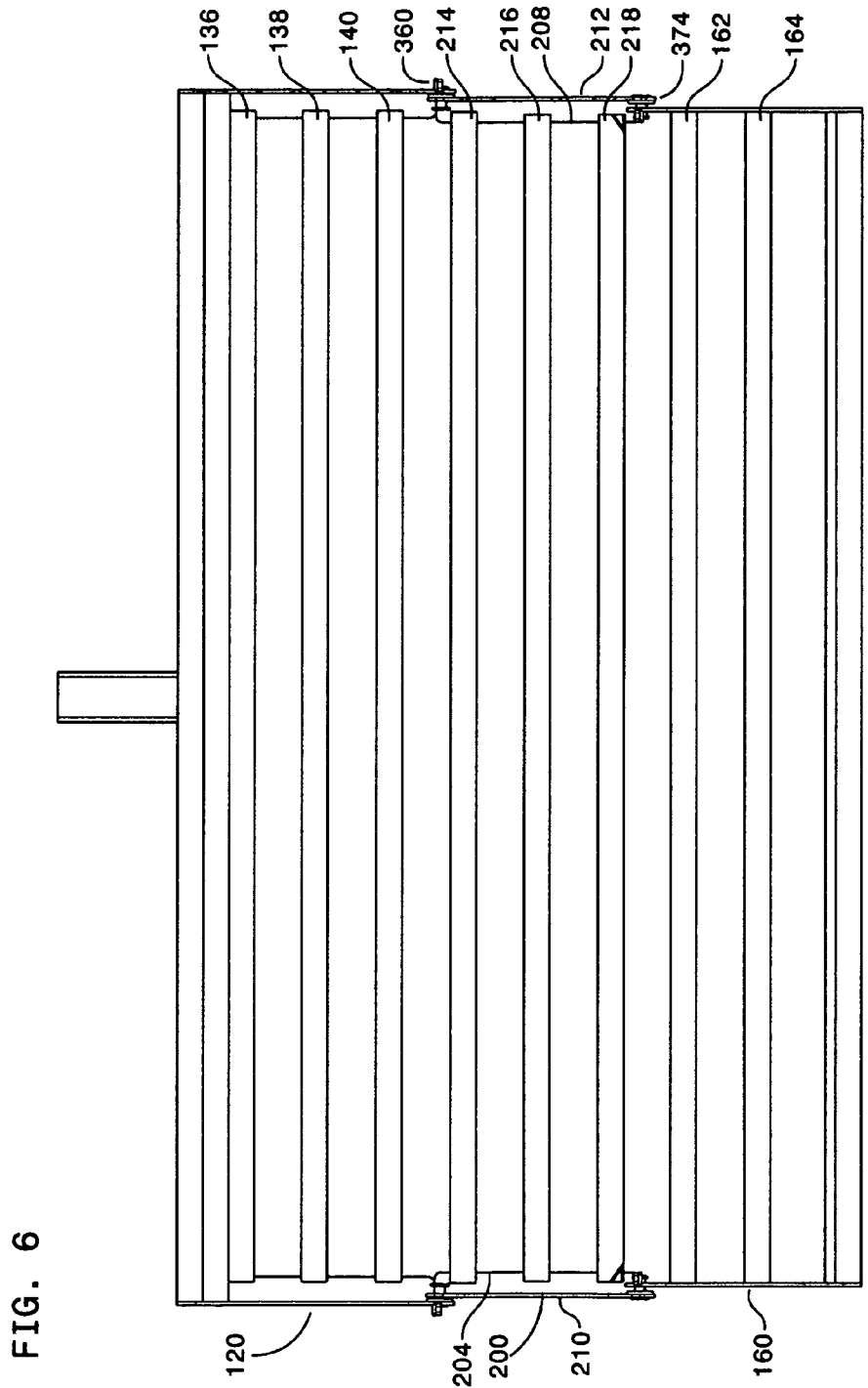
FIG. 6 depicts a top plan view of the barred cargo assembly 100 of this invention in barred open position 102.
Figure 7:
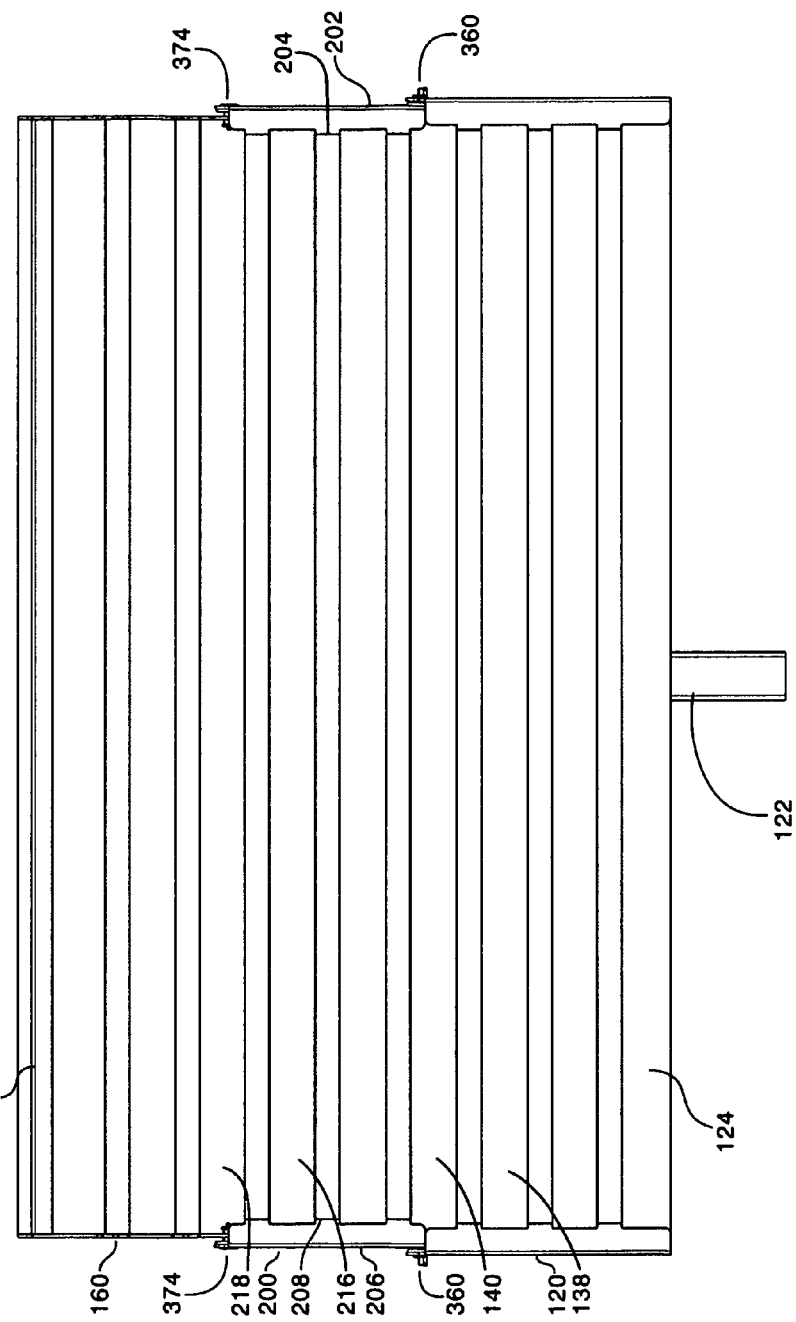
FIG. 7 depicts a bottom plan view of the barred cargo assembly 100 of this invention in barred open position 102 and a reverse of FIG. 6.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

A foldable carrier tray cooperates with the hitch of a vehicle to facilitate carrying of a desired cargo. With the carrier having foldable and nestable sections the idea of struggling with attaching the tray each time something must be hauled is minimized. The nestable sections for the tray with the fold up option permit use of the back door of a vehicle, even with the cargo in place. The main concept is to allow the platform to be supported by two triple fold ends that carry the weight much like the forks of a forklift. The floor of the carrier is preferably made up of square metal tubes. The two triple fold ends are strong when unfolded and carrying cargo. They nest together for compact storage in a folded position, whether the carrier tray is on the vehicle or off.

Figure 23:
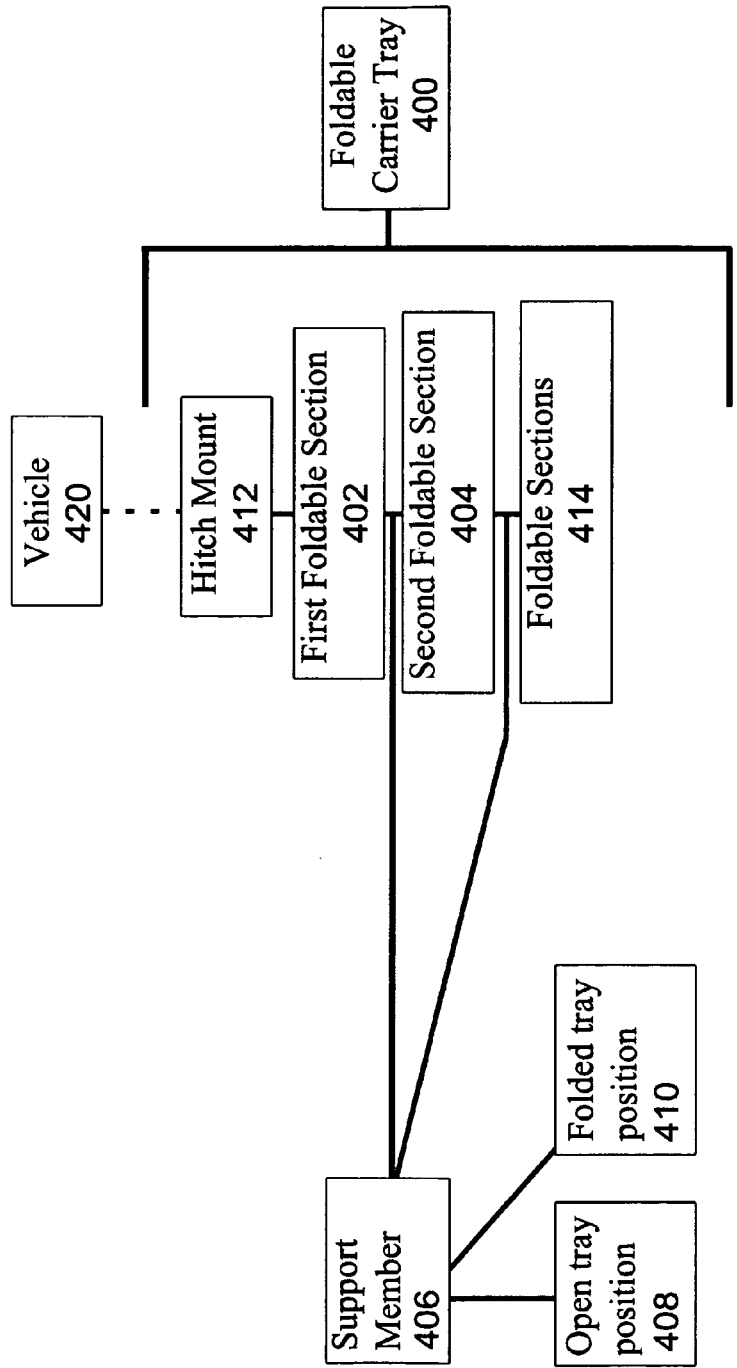
FIG. 23 depicts a block diagram of foldable carrier tray 400 of this invention.

Now adding FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 to the consideration, the structure and function of barred cargo assembly 100 can be clearly seen. In FIG. 1, FIG. 2, FIG. 3, FIG. 4, FIG. 5, FIG. 6, and FIG. 7, the barred cargo assembly 100 is in barred open position 102 as a form of a foldable carrier tray 400 (FIG. 23). Barred cargo assembly 100 has a barred hitch section 120, a barred end section 160, and a barred center section 200 there between. Barred hitch section 120 has a hitch mount 122 which can connect to the trailer hitch of a vehicle 420 (FIG. 23). Hitch mount 122 is fixed on hitch bar 124.

At one end of hitch bar 124 is first hitch end cap 126. At the opposing end of hitch bar 124 is second hitch end cap 128. First hitch end cap 126 and second hitch end cap 128 are preferably substantially symmetrical. Above hitch bar 124 and between first hitch end cap 126 and second hitch end cap 128 is hitch support bar 130. At a bottom edge of first hitch end cap 126 is first hitch lip 132. At a bottom edge of second hitch end cap 128 is second hitch lip 134. First hitch lip 132 and second hitch lip 134 are substantially similar in shape.

Secured to and resting on first hitch lip 132 and second hitch lip 134 are first hitch brace 136, second hitch brace 138 and third hitch brace 140. First hitch brace 136 is adjacent to and at least substantially parallel to hitch bar 124. Second hitch brace 138 and third hitch brace 140 are substantially parallel to and have a substantially coplanar surface with first hitch brace 136. Typically, second hitch brace 138 is between first hitch brace 136 and third hitch brace 140.

First hitch end cap 126 has first hitch face 142 extending upwardly from first hitch lip 132 at about a right angle thereto. Likewise second hitch end cap 128 has second hitch face 144 extending upwardly from second hitch lip 134. Each of first hitch face 142 and second hitch face 144 has a first hitch face aperture 146 and second hitch face aperture 148 therein. Each first hitch face aperture 146 is adjacent to first hitch brace 136, second hitch brace 138, and third hitch brace 140. Each second hitch face aperture 148 is above the first hitch face aperture 146.

Barred end section 160 includes a first end brace 162 and a second end brace 164 with a first end support 168 and a second end support 170. First end support 168 and a second end support 170 are on opposing ends of first end brace 162 and second end brace 164. First end brace 162 and second end brace 164 are substantially parallel to each other between the first end support 168 and the second end support 170. First end brace 162 and second end brace 164 are connected on opposing ends to first end support 168 and second end support 170 through any suitable attachment means such as, but limited to, welding and fasteners. This connection provides a secure and stable relationship.

First end support 168 and second end support 170 have a first end opening 172 adjacent to first end brace 162 and second end brace 164. First end support 168 and second end support 170 also have second end opening 174 above first end opening 172. Second end opening 174 and first end opening 172 provide gripping sites to operate barred cargo assembly 100 and move it between barred open position 102, barred folded position 104, and partially barred folded position 106 without weakening the structure thereof.

A plate member 186 is mounted on barred end section 160 near second end brace 164 to connect first end support 168 and second end support 170. Plate member 186 has an upper lip 188 extending into a closing sheet 190. Within closing sheet 190 may be gripping slots 192 for moving barred cargo assembly 100 between barred open position 102, barred folded position 104, and partially barred folded position 106.

Barred center section 200 is similar in structure to barred hitch section 120. First center end cap 202 has first center lip 204 at a bottom edge thereof. At a bottom edge of second center end cap 206 is second center lip 208. The rest of first center end cap 202 is first center plate 210 extending upwardly from first center lip 204. The rest of second center end cap 206 is second center plate 212 extending upwardly from second center lip 208.

Secured to and resting on first center lip 204 and second center lip 208 are first center brace 214, second center brace 216, and third center brace 218. First center brace 214 is adjacent to and at least substantially parallel to second center brace 216. Second center brace 216 and third center brace 218 are substantially parallel to and have a substantially coplanar surface with first center brace 214. Typically, second center brace 216 is between first center brace 214 and third center brace 218.

Each of first center plate 210 and second center plate 212 has a first center face aperture 220 and second center face aperture 222 therein. Each first center face aperture 220 is adjacent to first center brace 214, second center brace 216, and third center brace 218. Each second center face aperture 222 is above the first center face aperture 220.

Barred hitch section 120 is pivotably secured to barred center section 200 through first nut and bolt assembly 360. Barred center section 200 is pivotably secured to barred end section 160 through second nut and bolt assembly 374. While a nut and bolt assembly is the preferred embodiment, a rivet, a lynch pin and cotter pin assembly, or any other suitable fastener that can provide a secure yet pivotable relationship is encompassed by this disclosure.

Figure 8:
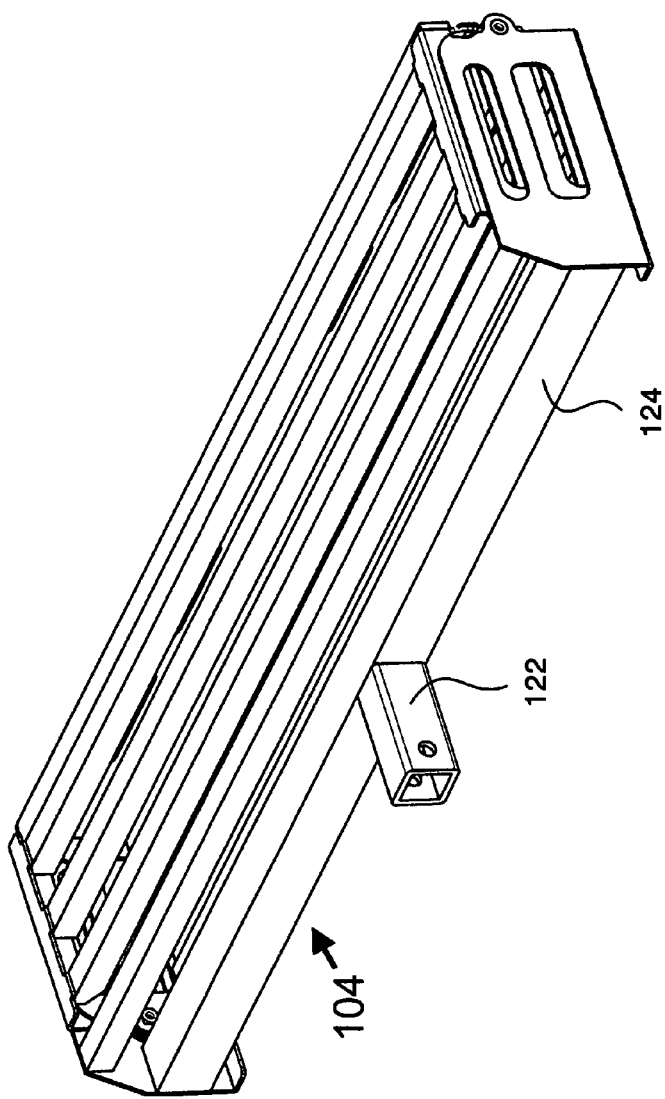
FIG. 8 depicts a perspective view of the barred cargo assembly 100 of this invention in completely barred folded position 104.
Figure 9:
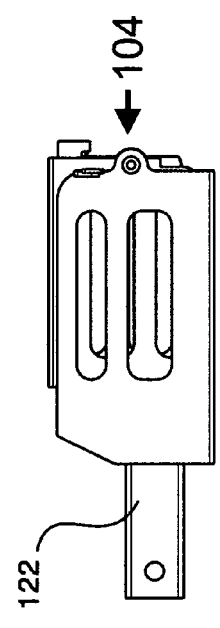
FIG. 9 depicts a side view of the barred cargo assembly 100 of this invention in completely barred folded position 104, based on FIG. 8.

Now adding FIG. 8 and FIG. 9 to the consideration, the flexibility of barred cargo assembly 100 can be seen. Barred cargo assembly 100 is in completely barred folded position 104 in contrast to FIG. 7 which shows the barred open position 102. Barred hitch section 120 receives the nested assembly of barred end section 160 nested within barred center section 200. The braces, such as 136, 138, 140, 162, 164, 214, 216, and 218, are usually hollow metal tubes. The supports or faces such as, 142, 144, 202, 206, 168, and 170, are flat metal plates.

Figures 10, 11:
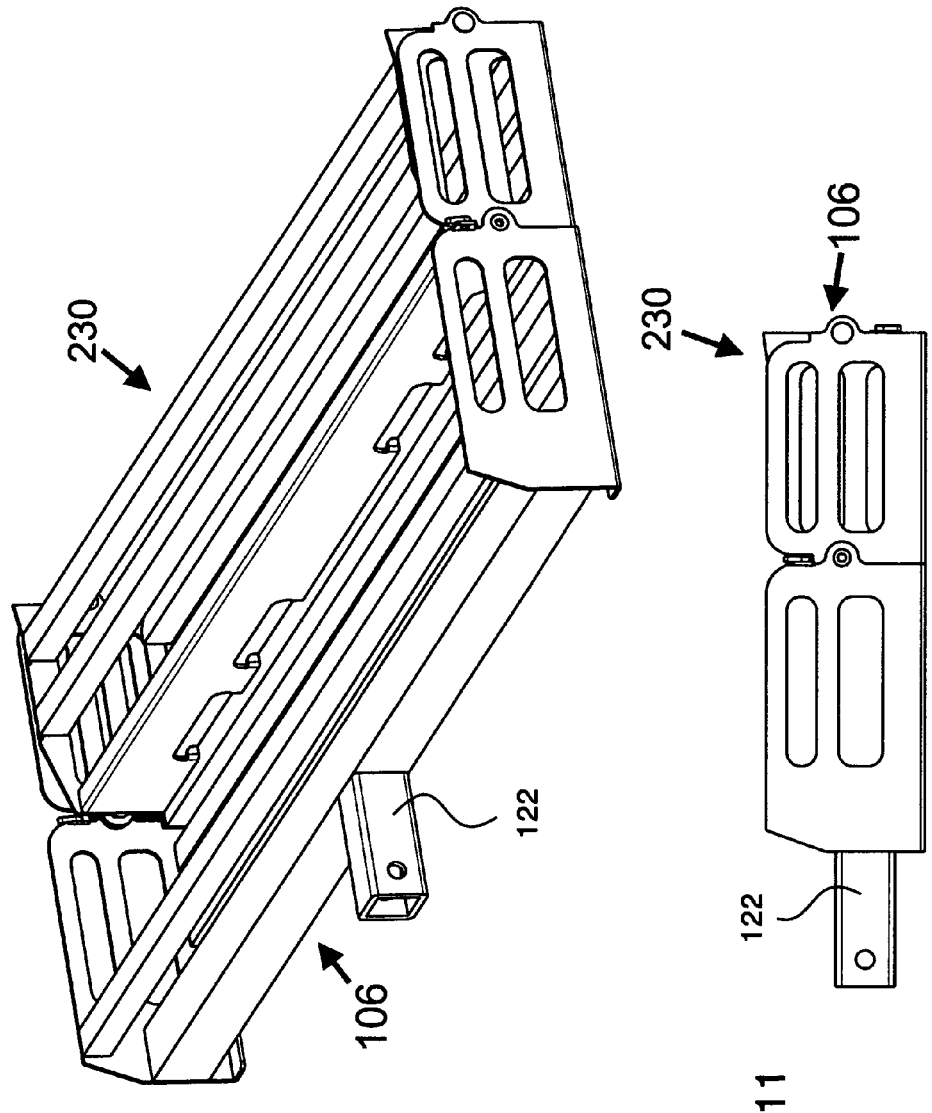
FIG. 10 depicts a perspective view of the barred cargo assembly 100 of this invention in partially barred folded position 106.
FIG. 11 depicts a side view of the barred cargo assembly 100 of this invention in partially barred folded position 106, based on FIG. 10.

With FIG. 10 and FIG. 11, the barred cargo assembly 100 is in partially barred folded position 106 and barred end section 160 is nested within barred center section 200 to form partial nest assembly 230. Partial nest assembly 230 can then be inserted into barred hitch section 120 for the barred folded position 104 of FIG. 8. Bolt assemblies 360 and 374 provide the rotation from barred open position 102 to partially barred folded position 106 to barred folded position 104, and hold together the parts and permit the nest structure hinge. Barred cargo assembly 100 is useful for carrying wheeled vehicles or other cargo.

Figure 12:
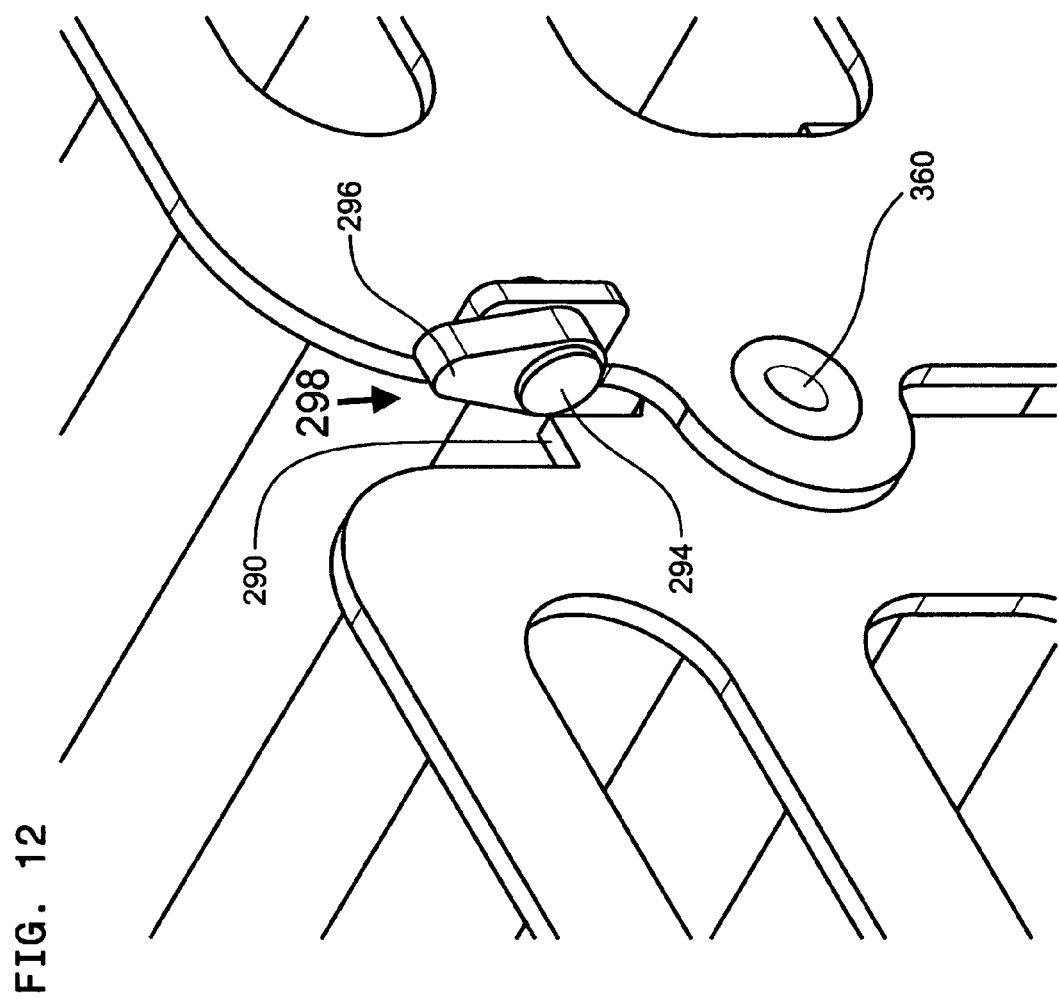
FIG. 12 depicts a side perspective view of latch 298.
Figure 14:
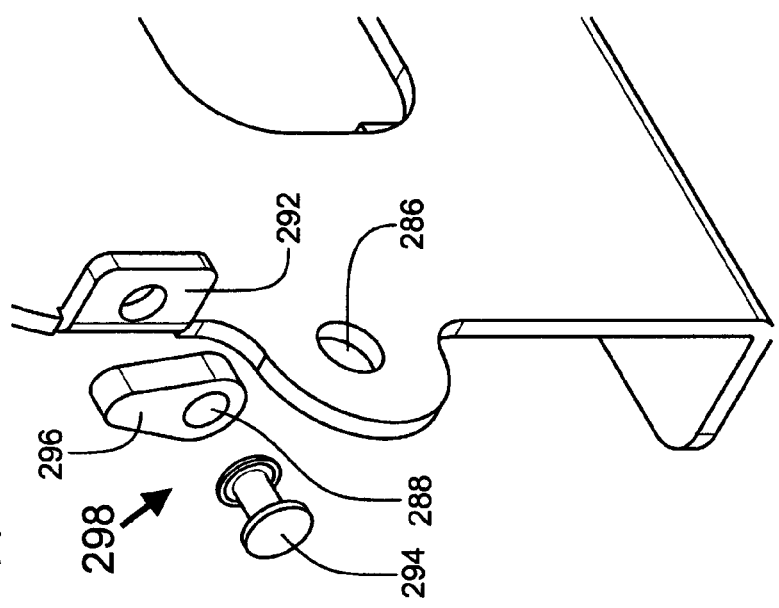
FIG. 14 depicts an exploded perspective view of latch 298.
Figure 13:
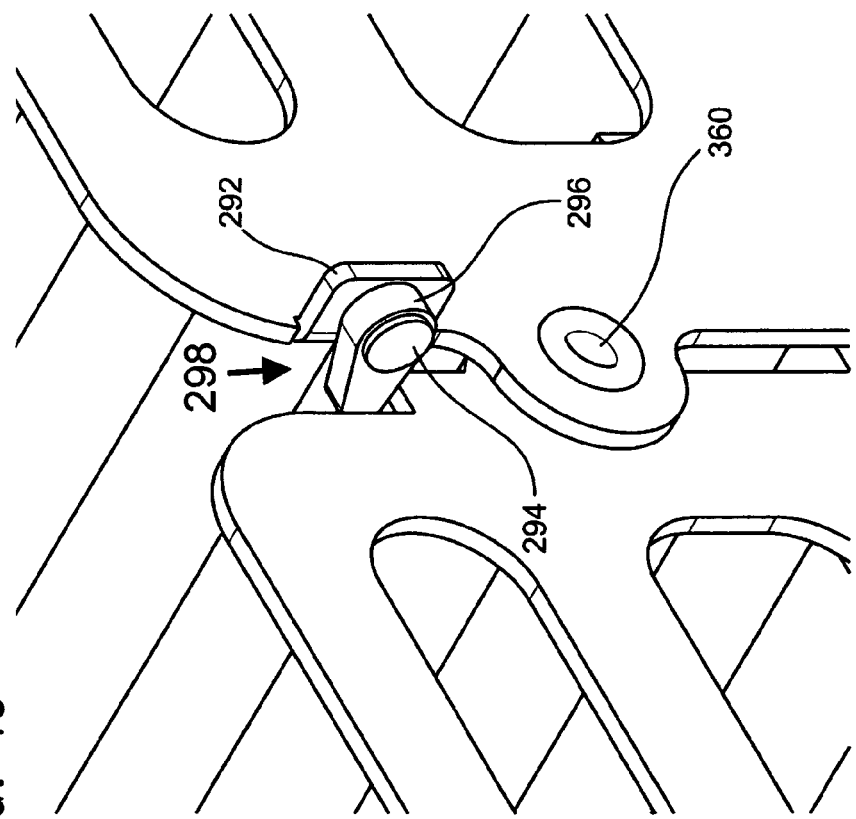
FIG. 13 depicts a side perspective view of latch 298 in slot 290.

Now referring to FIG. 12, FIG. 13, and FIG. 14, the structure and function of latch 298 can be clearly seen. Barred hitch section 120 and barred center section 200 may have latch 298 cooperating to support barred open position 102. Barred center section 200 and barred end section 160 also may have latch 298 cooperating to support barred open position 102.

In the preferred embodiment, latch 298 is a teardrop shaped structure 296 with an aperture 288 through the larger end. The teardrop shaped structure 296 is secured through pin 294 which cooperates with plate aperture 286 on plate 292 to form the movable connection.

The plate 292 is attached to barred hitch section 120 or barred end section 160 at first hitch face 142, second hitch face 144, first end support 168, and second end support 170. The teardrop shaped structure 296 pivots around pin 294. The smaller end of the teardrop shaped structure 296 inserts into the slot 290 between the side of barred hitch section 120 and barred center section 200 or barred center section 200 and barred end section 160, thus creating a wedge to support barred open position 102. Teardrop shaped structure 296 pivots upward and out of the slot 290 to disengage the wedge effect and permit barred end section 160 and barred center section 200 to fold upward around the pivot point of pin 294. Thus, latch 298 acts as a catch with the teardrop shaped structure 296 and pin 294 preventing any upward movement of barred hitch section 120, barred center section 200, or barred end section 160 during use. This structure provides strength to the barred cargo assembly 100 in barred open position 102.

Turning now to FIG. 15, FIG. 16, FIG. 17, FIG. 18, FIG. 19, FIG. 20, and FIG. 21, the structure of platform cargo assembly 300 of this invention can be seen. With FIG. 15 and FIG. 16, the platform cargo assembly 300 of this invention is in platform open position 302 as a form of a foldable carrier tray 400 (FIG. 23). More particularly, one or more of hinge assembly 310 supports a hitch platform 312, central platform 314, and end platform 316. Mounting bar 332 is adjacent to hitch platform 312 with a centrally located hitch 334, for securing to a vehicle 420 (FIG. 23).

Two, or more, of hinge assemblies 310 are used to support hitch platform 312, central platform 314, and end platform 316. Each hinge assembly 310 has a first hinge member 340 and a second hinge member 342. First hinge member 340 is generally L-shaped with a hook end 344 to engage and secure mounting bar 332 on a bottom side 336 and a front side 338. Also, first hinge member 340 has projection 330 which extends upwardly between hitch platform 312 and mounting bar 332 for further strength and support. First hinge member 340 has a first long arm 346 running under hitch platform 312. First long arm 346 extends into first hinge arm pair 354. First hinge arm pair 354 extends between hitch platform 312 and central platform 314. One member of first hinge arm pair 354 is attached to hitch platform 312 and the other member of first hinge arm pair 354 is attached to the central platform 314. First hinge arm pair 354 has first hinge aperture 390.

Second hinge member 342 has second hinge arm pair 356 with a second long arm 358. Second hinge member 342 has second long arm 358 running under central platform 314. Second hinge arm pair 356 appears between central platform 314 and end platform 316. One member of second hinge arm pair 356 is attached to central platform 314 and the other member of second hinge arm pair 356 is attached to end platform 316. Second hinge arm pair 356 has second hinge aperture 384. Second hinge arm pair 356 is preferably shorter than first hinge arm pair 354, to facilitate movement as shown in FIG. 18 and FIG. 20.

First hinge arm pair 354 and second hinge arm pair 356 are attached to hitch platform 312, central platform 314, and end platform 316 through any suitable fastening means. The fastening means may be, but are not limited to, rivets, bolts, and mounting flanges.

With FIG. 17 and FIG. 18, platform cargo assembly 300 is in platform partially folded position 304. End platform 316 is folded onto central platform 314. Third fastener assembly 382 cooperates with second hinge aperture 384 to create this pivotable and partially rotational relationship. Third fastener assembly can be a rivet, a nut and bolt assembly, or any other fastening means which provides a secure yet pivotable relationship between second hinge arm pair 356.

When platform cargo assembly 300 is returned to platform open position 302, end platform 316 is pivoted off of central platform 314 and secured in position through second hinge arm pair 356. Second hinge arm pair 356 wedges against end platform 316 and central platform 314 and prevents end platform 316 from pivoting downward any further. Thus, end platform 316 is held in a substantially planar position with hitch platform 312 and central platform 314.

Figure 21:
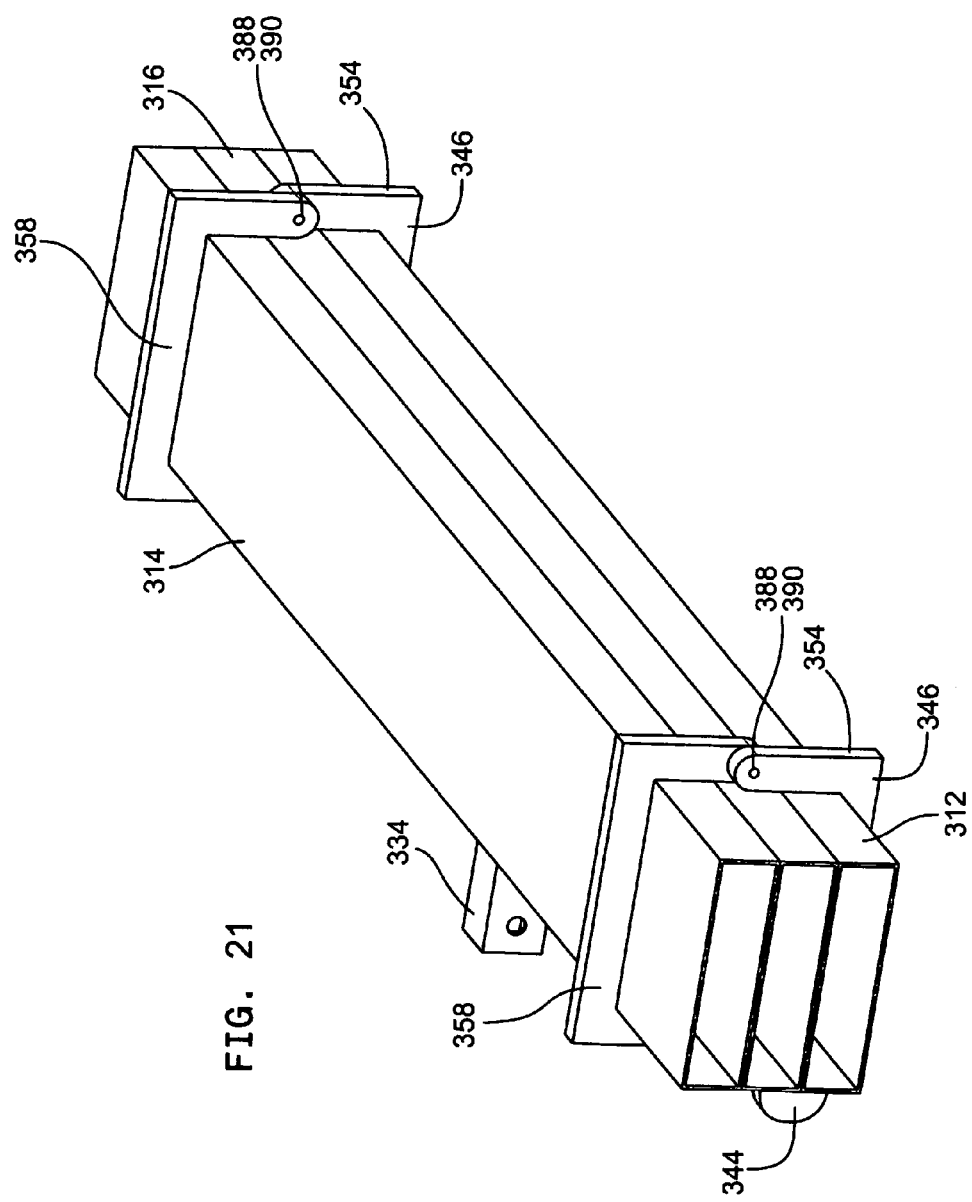
FIG. 21 depicts a rear, perspective view of platform cargo assembly 300 of this invention in platform fully folded position 306 based on FIG. 19.

In FIG. 19, FIG. 20, and FIG. 21, platform cargo assembly 300 is in platform fully folded position 306. End platform 316 and central platform 314 are folded onto hitch platform 312 and end platform 316 is between central platform 314 and hitch platform 312. Platform fully folded position 306 permits storage of platform cargo assembly 300 on a vehicle 420 (FIG. 23) when not in use.

End platform 316 and central platform 314 are folded onto hitch platform 312. Fourth fastener assembly 388 cooperates with first hinge aperture 390 to create this pivotable and partially rotational relationship. Fourth fastener assembly 388 can be a nut and bolt assembly, a rivet, or any other fastening means capable of providing a secure and pivotable relationship between first hinge arm pair 354.

The platforms, 312, 314, and 316, are preferably hollow, rectangular, metal tubes. The other parts are preferably sheet metal. Platform cargo assembly 300 supports boxes, containers, and other cargo.

Figure 22:
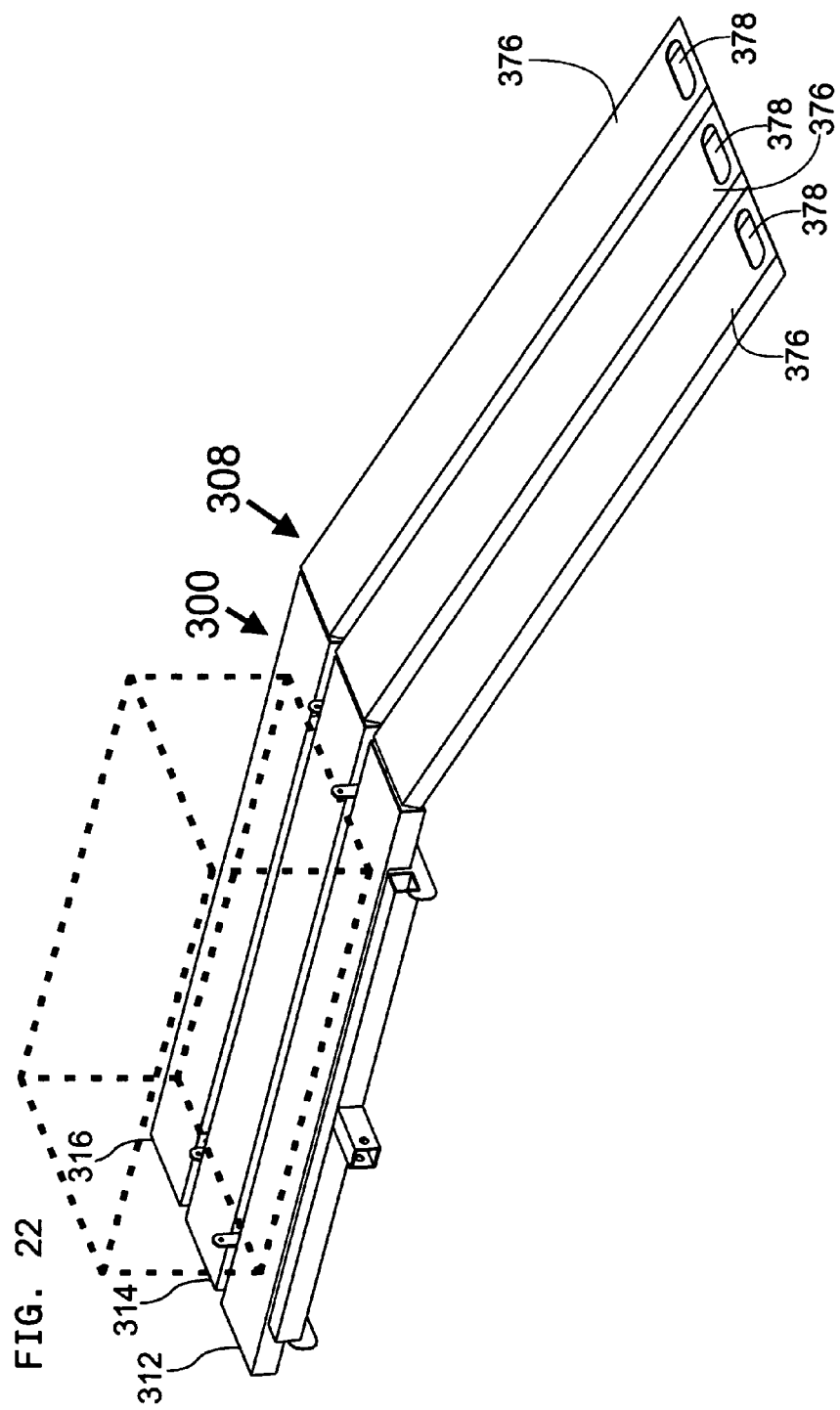
FIG. 22 depicts a front, perspective view of the platform cargo assembly 300 of this invention in platform loading position 308 with cargo depicted in phantom.

Adding FIG. 22 to the consideration, platform loading position 308 of platform cargo assembly 300 can be clearly seen. Hitch platform 312, central platform 314, and end platform 316 each have extensions 376 which extend out from their interiors. At the end of each extension 376 is grip 378 which facilitates movement of extensions 376 into and out of platforms 312, 314, and 316. The extensions 376 aid in moving wheeled vehicles and other heavy cargo onto platform cargo assembly 300.

FIG. 23 depicts a block diagram of foldable carrier tray 400 of this invention of which may be the barred cargo assembly 100 (FIG. 1) or platform cargo assembly 300 (FIG. 15).

Foldable carrier tray 400 has at least a first foldable section 402 and a second foldable section 404. A support member 406 permits foldable carrier tray 400 to be supported with first foldable section 402 and second foldable section 404 in open tray position 408 or a folded tray position 410. Folded tray position 410 can be a partially folded or fully folded position as seen in earlier embodiments. Vehicle 420 can support first foldable section 402 at hitch mount 412 and hence foldable carrier tray 400 thereon. As many additional foldable sections 414 as desired can be added to second foldable section 404. Usually at least two or more foldable sections 414 are utilized.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A foldable cargo platform, which is mountable on a trailer hitch of a vehicle, and foldable to a folded position or unfolded to an open position in place on the vehicle comprising:
    a) at least a first section and a second section forming the cargo platform;
    b) the first section and the second section being movably connected;
    c) at least one hinge assembly supporting the foldable cargo platform;
    d) the at least one hinge assembly supporting the at least a first section and a second section;
    e) the at least a first section and a second section including a central platform between an end platform and a hitch platform;
    f) a mounting bar being mounted adjacent to the hitch platform;
    g) a centrally located hitch being mounted on the mounting bar in order to secure the mounting bar to the vehicle;
    h) the at least one hinge assembly including a first hinge member and a second hinge member;
    i) the first hinge member being generally L-shaped with a hook end;
    j) the hook end engaging the mounting bar;
    k) the first hinge member having a first long arm;
    l) the first long arm extending into a first hinge arm pair; and
    m) the first hinge arm pair extending between the hitch platform and the central platform.

2. The foldable cargo platform of claim 1 further comprising:
    a) the second hinge member being generally L-shaped;
    b) the second hinge member having a second long arm extending into a second hinge arm pair; and
    c) the second hinge arm pair being positioned between the central platform and the end platform.

3. The foldable cargo platform of claim 2 further comprising:
    a) the first hinge arm pair including a first hinge aperture to receive a fastener in order to secure the hitch platform to the central platform in a partially and selectively rotational fashion; and
    b) the second hinge arm pair including a second hinge aperture to receive a fastener in order to secure the end platform to the central platform in a partially and selectively rotational fashion.

4. The foldable cargo platform of claim 3 further comprising the second hinge arm pair being shorter than the first hinge arm pair in order to facilitate movement.

5. The foldable cargo platform of claim 4 further comprising:
    a) the fasteners permitting the platform cargo assembly to be folded or partially folded or unfolded; and
    b) the foldable cargo platform being movable with the end platform foldable onto the central platform and then foldable onto to the hitch platform.

6. The foldable cargo platform of claim 5 further comprising:
    a) the end platform, the central platform and the hitch platform being hollow, rectangular, metal tubes;
    b) sheet metal pieces forming the remainder of the platform cargo assembly supports and other containers;
    c) the central platform, the end platform, and the hitch platform each having an extension;
    d) the extension being insertable into or extendable out of the central platform, the end platform, or the hitch platform; and
    e) the extension being extended from the central platform, the end platform, or the hitch platform to create a platform loading position.

7. A foldable carrier tray comprising:
    at least a first foldable section and a second foldable section;
    a support member connecting the first foldable section and the second foldable section;
    the foldable carrier tray being releasably attachable to a vehicle;
    the foldable carrier tray being movable between an open tray position and a folded tray position;
    the open tray position permitting use of the foldable carrier tray;
    the first section being mounted adjacent to the vehicle;
    the second section being mounted on the first section and oppositely disposed from the vehicle;
    the folded tray position permitting storage of the foldable carrier tray;
    at least the first foldable section and the second foldable section forming a cargo platform;
    the first foldable section and the second foldable section being movably connected;
    at least one hinge assembly supporting the foldable cargo platform;
    the at least one hinge assembly supporting the at least a first foldable section and a second foldable section;
    the at least a first foldable section and a second foldable section including a central platform between an end platform and a hitch platform;
    a mounting bar being mounted adjacent to the hitch platform;
    a centrally located hitch being mounted on the mounting bar in order to secure the mounting bar to the vehicle;
    the at least one hinge assembly including a first hinge member and a second hinge member;
    the first hinge member being generally L-shaped with a hook end;
    the hook end engaging the mounting bar;
    the first hinge member having a first long arm;
    the first long arm extending into a first hinge arm pair; and the first hinge arm pair extending between the hitch platform and the central platform.

8. The foldable carrier tray of claim 7 further comprising:
a) the second hinge member being generally L-shaped;
b) the second hinge member having a second long arm extending into a second hinge arm pair; and
c) the second hinge arm pair being positioned between the central platform and the end platform.

9. The foldable carrier tray of claim 8 further comprising the at least a first foldable section and a second foldable section further including a third foldable section and a fourth foldable section.

* * * * *